United States Patent
Hong et al.

(10) Patent No.: US 11,820,201 B2
(45) Date of Patent: Nov. 21, 2023

(54) METHOD FOR CONTROLLING VEHICLE HVAC SYSTEM

(71) Applicants: HYUNDAI MOTOR COMPANY, Seoul (KR); KIA CORPORATION, Seoul (KR)

(72) Inventors: Gyu Sik Hong, Yongin-si (KR); Jun Ho Song, Hwaseong-si (KR); Tae Han Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 210 days.

(21) Appl. No.: 17/387,663

(22) Filed: Jul. 28, 2021

(65) Prior Publication Data
US 2022/0126648 A1    Apr. 28, 2022

(30) Foreign Application Priority Data

Oct. 26, 2020  (KR) .......................... 10-2020-0139623

(51) Int. Cl.
*B60H 1/00* (2006.01)

(52) U.S. Cl.
CPC ..... *B60H 1/00735* (2013.01); *B60H 1/00828* (2013.01); *B60H 1/00857* (2013.01); *B60H 1/00878* (2013.01)

(58) Field of Classification Search
USPC .................................................. 454/69–165
See application file for complete search history.

(56) References Cited

U.S. PATENT DOCUMENTS

| | | | |
|---|---|---|---|
| 2007/0209789 A1* | 9/2007 | Oomura | F25B 49/022 62/229 |
| 2010/0181061 A1* | 7/2010 | Ozeki | B60H 1/00842 165/41 |
| 2015/0345841 A1* | 12/2015 | Yokoyama | F04F 5/46 62/500 |
| 2016/0167478 A1* | 6/2016 | Lee | B60H 1/243 165/203 |
| 2017/0174045 A1* | 6/2017 | Shimauchi | B60H 1/00885 |
| 2018/0215231 A1* | 8/2018 | Porras | B60L 58/26 |
| 2020/0324614 A1* | 10/2020 | Hiramatsu | B60H 1/00742 |
| 2021/0001682 A1* | 1/2021 | Schnaidt | B60H 1/00207 |

* cited by examiner

Primary Examiner — Ko-Wei Lin
(74) Attorney, Agent, or Firm — LEMPIA SUMMERFIELD KATZ LLC

(57) ABSTRACT

A vehicle HVAC system includes: a casing to direct air from outdoors into the interior of a passenger compartment, an air blower blowing the air into the casing, an evaporator disposed in the casing, a heater core disposed downstream of the evaporator, and front and rear seat side temperature doors disposed between the evaporator and the heater core. A method for controlling the HVAC system includes: determining, by a controller, whether a required temperature for cooling rear seats is set to be lower than a required temperature for cooling front seats after an outdoor condition of a vehicle meets a reference high temperature condition; and lowering, by the controller, a target temperature of the evaporator based on the set required temperature for cooling the rear seats when the required temperature for cooling the rear seats is set to be lower than the required temperature for cooling the front seats.

10 Claims, 10 Drawing Sheets

METHOD FOR CONTROLLING VEHICLE HVAC SYSTEM

CROSS-REFERENCE TO RELATED APPLICATION

This application claims priority to and the benefit of Korean Patent Application No. 10-2020-0139623, filed on Oct. 26, 2020, the entire contents of which are incorporated herein by reference.

FIELD

The present disclosure relates to a method for controlling a vehicle heating, ventilation, and air conditioning (HVAC) system.

BACKGROUND

The statements in this section merely provide background information related to the present disclosure and may not constitute prior art.

It is known to provide heating, ventilation, and air conditioning (HVAC) systems in vehicles. These HVAC systems heat and cool the air within a passenger compartment for the comfort of vehicle passengers. Some vehicle HVAC systems may be selectively configured to change the source of air. In one configuration, the HVAC system draws in fresh air from outdoors, conditions the air, and then circulates the conditioned air into the passenger compartment. In another configuration, the HVAC system draws in a mixture of outdoor air and indoor air, conditions the mixture air, and then pumps the conditioned air into the passenger compartment.

The vehicle HVAC system includes an evaporator, a heater core, and a temperature door inside a casing. The casing has an inlet through which the air is allowed to draw in and a plurality of outlets through which the air is directed into the passenger compartment. The evaporator is configured to cool the air, and the heater core is configured to heat the air flowing into the passenger compartment. The temperature door (also known as the "air mixing door") is disposed between the evaporator and the heater core. The evaporator is disposed upstream of the temperature door, and the heater core is disposed downstream of the temperature door. The temperature door is configured to adjust the flow rate of air passing through the heater core, thereby controlling the temperature of the air directed into the passenger compartment.

Meanwhile, a method for controlling a vehicle HVAC system includes: a single-zone control method that controls the entire passenger compartment of the vehicle as a single zone; and a dual-zone control method that divides the interior space of the passenger compartment into a zone surrounding a driver's seat (i.e., a space around the driver's seat) and a zone surrounding a front passenger seat (i.e., a space around the front passenger seat) and controls the two zones independently.

In recent years, a triple-zone control method that divides the interior space of the passenger compartment into a zone surrounding the driver's seat, a zone surrounding the front passenger seat, and a zone surrounding rear seats (i.e., a space around the rear seats) and controls the triple zones independently has been used in the vehicle HVAC systems.

Meanwhile, the triple-zone control method adjusts the flow rate of cooled air directed to the interior of the vehicle and a target temperature of the evaporator according to the setting of a required temperature for cooling front seats. Accordingly, it is impossible to independently control a rear seat side temperature (only the temperature in the rear zone of the passenger compartment) when a cooling requirement for the rear seats is greater than a cooling requirement for the front seats. Specifically, as the vehicle HVAC system operates in accordance with the cooling requirement for the front seats, its cooling performance with respect to the rear seats, compared to the front seats, may be relatively reduced when the vehicle is under the harsh outdoor condition (the outdoor temperature is relatively high and the solar energy transferred to the vehicle is high). For example, in the harsh outdoor condition, such as in the middle of the day, in which the outdoor temperature of the vehicle is 30° C. or higher and the solar energy of 500 W or higher is transferred to the vehicle, a required temperature for cooling the rear seats (that is, a required temperature for cooling the rear zone of the passenger compartment) is lower than a required temperature for cooling the front seats (that is, a required temperature for cooling the front zone of the passenger compartment), but it is impossible to independently lower only the rear seat side temperature to meet the required temperature for cooling the rear seats. Since a solar sensor measuring solar energy is not mounted on the rear glass of the vehicle but is only mounted on the front glass or windshield of the vehicle, it is impossible to independently control only the cooling temperature for the rear seats under the high temperature condition (e.g., midday in summer), which increases the discomfort of passengers seated in the rear seats.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a method for controlling a vehicle heating, ventilation, and air conditioning (HVAC) system capable of independently controlling a cooling temperature for rear seats by lowering the temperature of cooled air directed to the rear seats when a cooling requirement for rear seats is greater than a cooling requirement for front seats.

According to an aspect of the present disclosure, a method for controlling a vehicle HVAC system including a casing configured to direct air from outdoors into the interior of a passenger compartment, an air blower blowing the air into the casing, an evaporator disposed in the casing, a heater core disposed downstream of the evaporator, and a front seat side temperature door and a rear seat side temperature door disposed between the evaporator and the heater core may include: determining, by a controller, whether a required temperature for cooling rear seats is set to be lower than a required temperature for cooling front seats after an outdoor condition of a vehicle meets or reaches a reference high temperature condition; and lowering, by the controller, a target temperature of the evaporator based on the set required temperature for cooling the rear seats when the required temperature for cooling the rear seats is set to be lower than the required temperature for cooling the front seats.

The method may further include determining, by the controller, whether a maximum cooling operation for the rear seats is performed when the required temperature for cooling the rear seats is set to be lower than the required temperature for cooling the front seats. When the maximum cooling operation for the rear seats is performed, the target temperature of the evaporator set by the controller may be a second target temperature lower than a first target temperature set before the outdoor condition of the vehicle meets or reaches the reference high temperature condition.

The method may further include increasing, by the controller, RPM of the air blower based on the set required temperature for cooling the rear seats when the maximum cooling operation for the rear seats is performed.

The controller may increase a voltage applied to the air blower to increase the RPM of the air blower.

The voltage applied to the air blower may be a second voltage higher than a first voltage set before the outdoor condition of the vehicle meets or reaches the reference high temperature condition.

The method may further include reducing, by the controller, the opening degree of the front seat side temperature door based on the set required temperature for cooling the rear seats when the maximum cooling operation for the rear seats is performed.

The controller may reduce the opening degree of the front seat side temperature door by increasing a voltage applied to a front seat side actuator by which the front seat side temperature door is operated.

The voltage applied to the front seat side actuator may be a second voltage higher than a first voltage set before the outdoor condition of the vehicle meets or reaches the reference high temperature condition.

The controller may monitor the opening degree of the rear seat side temperature door to determine whether the maximum cooling operation for the rear seats is performed.

The controller may monitor the opening degree of the rear seat side temperature door by monitoring a voltage applied to a rear seat side actuator by which the rear seat side temperature door is operated.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
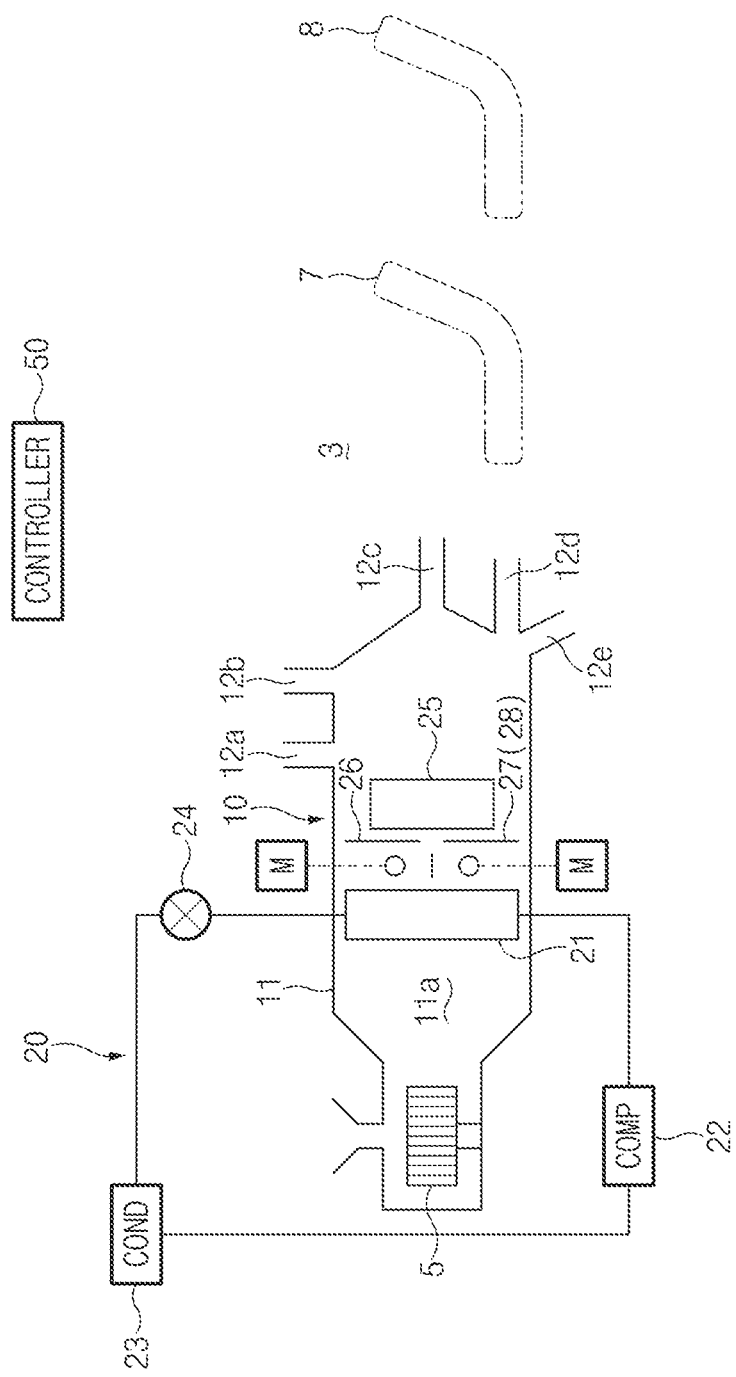
FIG. 1 illustrates a cross-sectional view of a vehicle heating, ventilation, and air conditioning (HVAC) system according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle heating, ventilation, and air conditioning (HVAC) system 10 according to an exemplary form of the present disclosure may include a casing 11, in which an evaporator 21, a heater core 25, and a plurality of temperature doors 26 and 27 are contained. The evaporator 21, the plurality of temperature doors 26 and 27, and the heater core 25 may be sequentially arranged within the casing 11 in an air flow direction from upstream to downstream.

The casing 11 may be mounted on a dash panel (not shown) by which a front compartment (not shown) and a passenger compartment 3 are divided, and the casing 11 may be configured to allow air to flow from the outside of the passenger compartment 3 into the interior of the passenger compartment 3. Front seats 7 and rear seats 8 may be arranged in the interior of the passenger compartment 3 on the front and rear of the vehicle, respectively.

The casing 11 may include an inlet 11a through which the air is allowed to draw in, and a plurality of outlets 12a, 12b, 12c, 12d, and 12e through which the air is directed into the passenger compartment 3. The inlet 11a may face the front compartment (not shown), and the plurality of outlets 12a, 12b, 12c, 12d, and 12e may face the passenger compartment 3. An air blower 5 may be connected to the inlet 11a, and the air blower 5 may blow the air into the casing 11. The plurality of outlets 12a, 12b, 12c, 12d, and 12e may include a defrost outlet 12a directing the air toward the front windshield of the vehicle, a face vent outlet 12b directing the air toward the face of a passenger seated in the front seat, a first floor outlet 12c directing the air toward the floor under the front seat, a console outlet 12d directing the air toward a rear console, and a second floor outlet 12e directing the air toward the floor under the rear seat. The inlet 11a may be located in the front compartment in front of the dash panel, and the plurality of outlets 12a, 12b, 12c, 12d, and 12e may be located in the passenger compartment behind the dash panel.

The evaporator 21 may be located upstream in the casing 11. In particular, the evaporator 21 may be disposed adjacent to the inlet 11a of the casing 11. The evaporator 21 may be configured to cool the air. For example, the evaporator 21 may constitute a known refrigeration cycle 20 together with a compressor 22, a condenser 23, and an expansion valve 24, and the evaporator 21 may be configured to cool the air using a refrigerant circulated by the operation of the refrigeration cycle.

The heater core 25 may be located downstream of the evaporator 21, and the heater core 25 may be disposed adjacent to the outlets 12a, 12b, 12c, 12d, and 12e of the casing 11. The heater core 25 may be configured to heat the air. For example, the heater core 25 may be configured to heat the air using an engine coolant heated by an engine. As another example, waste heat generated when electric/electronic components, such as a motor, power converters (an inverter, a converter, etc.), an on-board charger (OBC), and an autonomous driving controller, are operating may heat a coolant, and the heater core 25 may be configured to heat the air using the coolant heated by the waste heat. As another example, the heater core 25 may be configured to heat the air using a refrigerant compressed by the heating operation (heat pump function) of the refrigeration cycle.

The casing 11 may include an upper passage 31 and a lower passage 32 allowing the air cooled by the evaporator 21 to bypass the heater core 25. A top end of the heater core 25 may be spaced apart from a top wall of the casing 11 so that the upper passage 31 may be defined between the top end of the heater core 25 and the top wall of the casing 11. A bottom end of the heater core 25 may be spaced apart from a bottom wall of the casing 11 so that the lower passage 32 may be defined between the bottom end of the heater core 25 and the bottom wall of the casing 11. The upper passage 31 and the lower passage 32 may be divided by the heater core 25 on the downstream of the evaporator 21. In particular, the upper passage 31 and the lower passage 32 may be a straight passage guiding the air cooled by the evaporator 21 straightly, which may reduce the height of the casing 11 compared to the related art, thereby effectively making the HVAC system small and lightweight, and which may reduce the flow resistance of air, thereby increasing an air flow rate.

The evaporator 21 and the heater core 25 may face each other. The evaporator 21 and the heater core 25 may be parallel to each other. The evaporator 21 and the heater core 25 may be arranged in a line. In particular, each of the evaporator 21 and the heater core 25 may be upright along a substantially vertical direction, which may reduce the length of the casing 11, thereby effectively making the HVAC system small and lightweight.

According to the exemplary form of the present disclosure, the evaporator 21 and the heater core 25 may be vertically upright, and the upper passage 31 and the lower passage 32 allowing the air cooled by the evaporator 21 to bypass the heater core 25 may be defined as straight passages by the heater core 25 so that the evaporator 21, the heater core 25, and an air mixing space, which is a space behind the heater core 25, may be arranged in a line within the casing 11. Thus, the height and length of the casing 11 may be significantly reduced, so that the HVAC system 10 may be effectively miniaturized and lightweight.

The plurality of temperature doors 26 and 27 may be disposed between the evaporator 21 and the heater core 25. That is, the plurality of temperature doors 26 and 27 may be movable to cover or uncover the upper passage 31 and the lower passage 32 on the upstream of the heater core 25.

Figure 2:
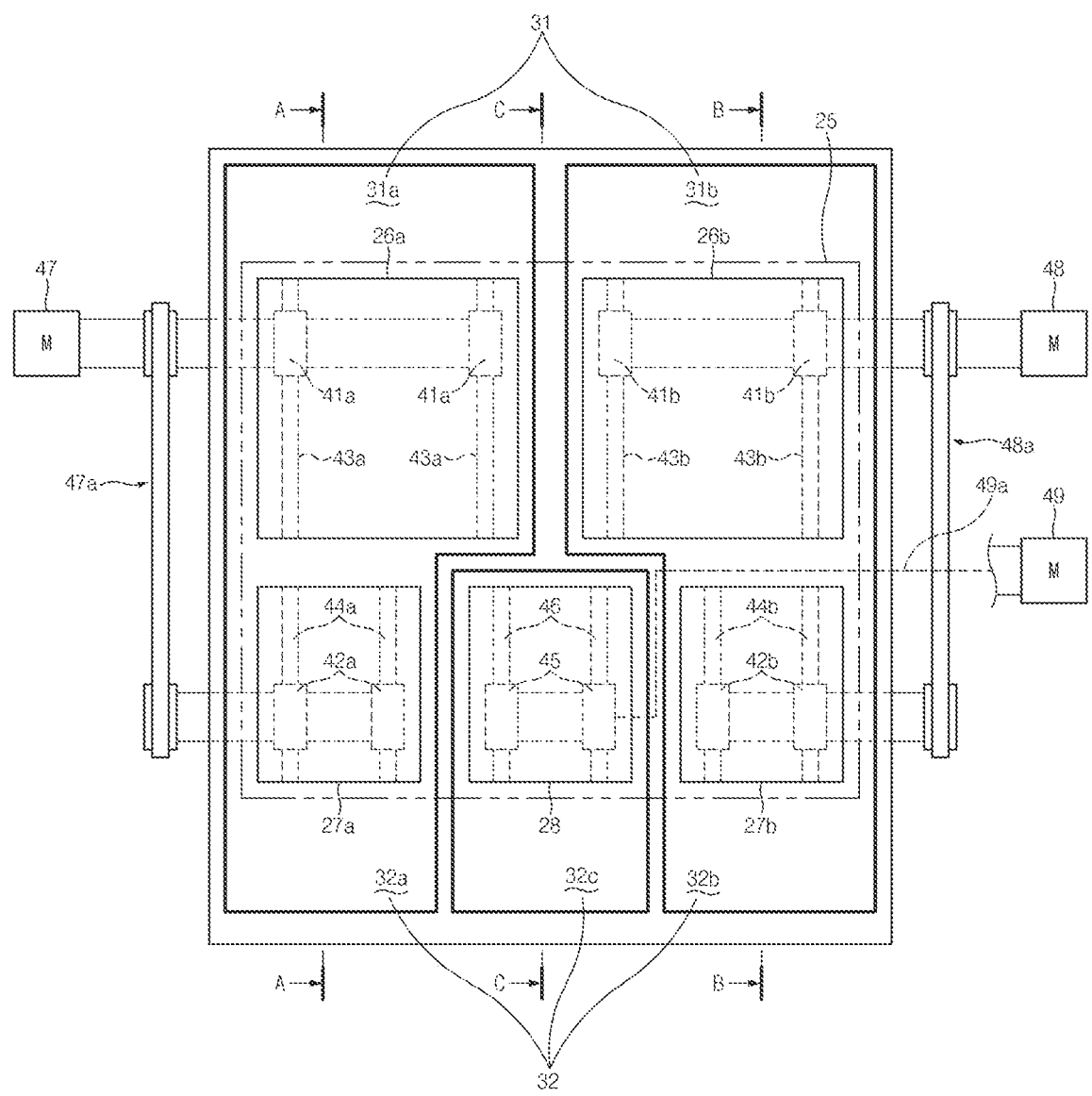
FIG. 2 illustrates a front sectional view of front seat side temperature doors and a rear seat side temperature door in a vehicle HVAC system according to an exemplary form of the present disclosure.

FIG. 2 illustrates a transverse sectional view of the arrangement of the plurality of temperature doors 26a, 26b, 27a, 27b, and 28 on the upstream of the heater core 25.

Referring to FIG. 2, the upper passage 31 may be divided into a first upper passage 31a and a second upper passage 31b. The first upper passage 31a may be arranged toward a driver's seat so that the air may be guided toward the driver's seat of the front seats in the passenger compartment, and the second upper passage 31b may be arranged toward a front passenger seat so that the air may be guided toward the front passenger seat of the front seats in the passenger compartment. The lower passage 32 may be divided into a first lower passage 32a, a second lower passage 32b, and a third lower passage 32c. The first lower passage 32a may be arranged toward the driver's seat so that the air may be guided toward the driver's seat of the front seats in the passenger compartment, and the second lower passage 32b may be arranged toward the front passenger seat so that the air may be guided toward the front passenger seat of the front seats in the passenger compartment. The third lower passage 32c may be arranged between the first lower passage 32a and the second lower passage 32b so that the air may be guided toward the rear seats in the passenger compartment. The first upper passage 31a, the second upper passage 31b, the first lower passage 32a, and the second lower passage 32b may be defined as front seat passages 31a, 31b, 32a, and 32b guiding the air cooled by the evaporator 21 toward the front seats 7, and the third lower passage 32c may be defined as a rear seat passage 32c guiding the air cooled by the evaporator 21 toward the rear seats 8.

The plurality of temperature doors 26a, 26b, 27a, 27b, and 28 may include a plurality of front seat side temperature doors 26a, 26b, 27a, and 27b regulating the flow of air and the flow rate of air directed to the front seats, and a rear seat side temperature door 28 regulating the flow of air and the flow rate of air directed to the rear seats.

The plurality of front seat side temperature doors 26a, 26b, 27a, and 27b may include a first upper temperature door 26a, a second upper temperature door 26b, a first lower temperature door 27a, and a second lower temperature door 27b. The first upper temperature door 26a may open (uncover) or close (cover) the first upper passage 31a, thereby regulating the flow of air and the flow rate of air directed toward the driver's seat of the front seats. The second upper temperature door 26b may open (uncover) or close (cover)

the second upper passage 31b, thereby regulating the flow of air and the flow rate of air directed toward the front passenger seat of the front seats. The first lower temperature door 27a may open (uncover) or close (cover) the first lower passage 32a, thereby regulating the flow of air and the flow rate of air directed toward the driver's seat of the front seats. The second lower temperature door 27b may open (uncover) or close (cover) the second lower passage 32b, thereby regulating the flow of air and the flow rate of air directed toward the front passenger seat of the front seats.

The rear seat side temperature door 28 may open (uncover) or close (cover) the third lower passage 32c, thereby regulating the flow of air and the flow rate of air directed toward the rear seats.

Figure 3:
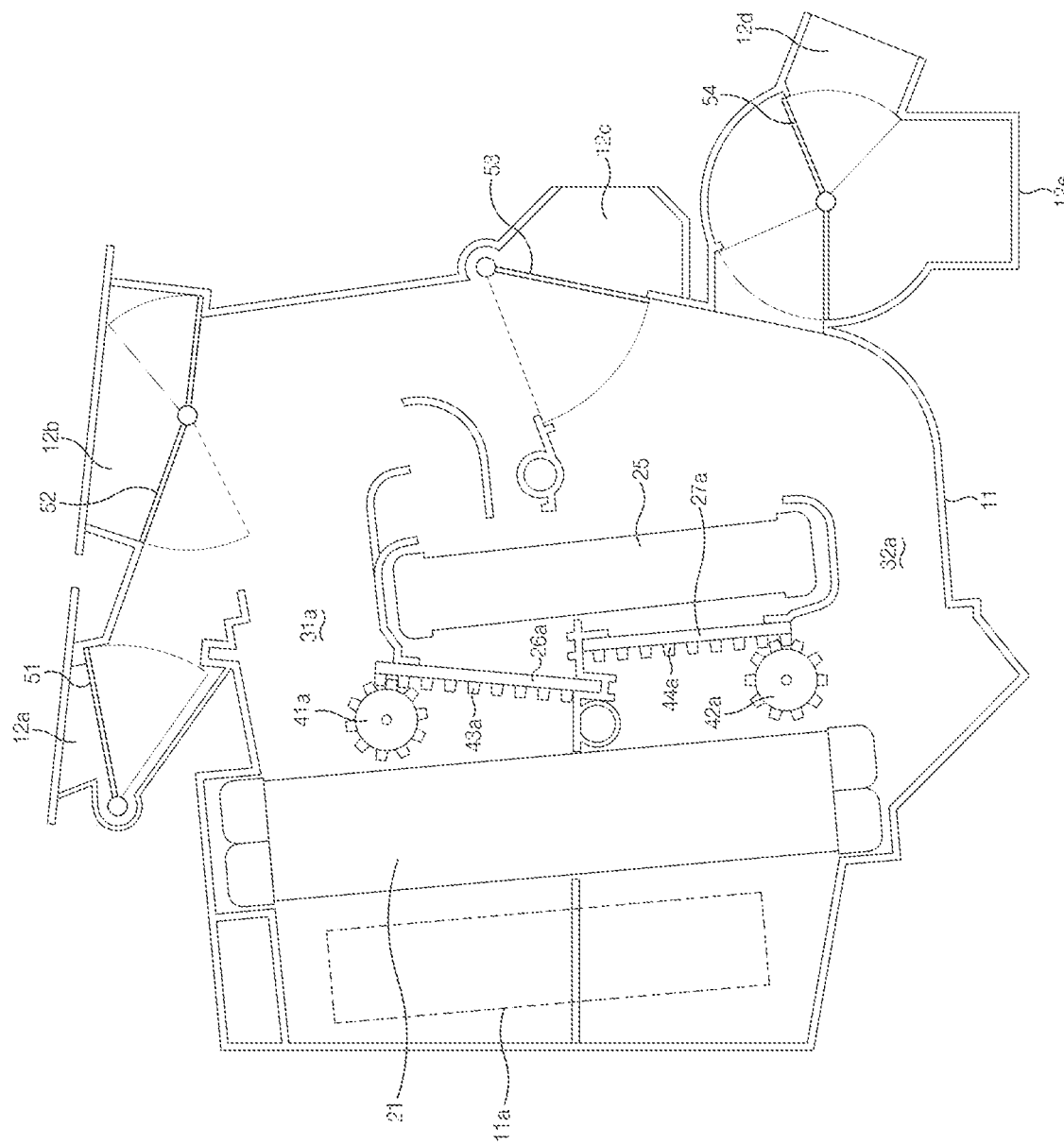
FIG. 3 illustrates a cross-sectional view taken along line A-A of FIG. 2.

Referring to FIGS. 2 and 3, the first upper temperature door 26a may move between a closed position in which the first upper passage 31a is fully closed and an open position in which the first upper passage 31a is fully opened. When the first upper temperature door 26a moves to the closed position, the air may pass through the heater core 25 and the air heated by the heater core 25 may be directed into the passenger compartment through the defrost outlet 12a, the face vent outlet 12b, the first floor outlet 12c, etc. When the first upper temperature door 26a moves to the open position, the air may pass through the first upper passage 31a and the air cooled by the evaporator 21 may be directed into the passenger compartment through the defrost outlet 12a, the face vent outlet 12b, the first floor outlet 12c, etc.

Referring to FIGS. 2 and 3, the first lower temperature door 27a may move between a closed position in which the first lower passage 32a is fully closed and an open position in which the first lower passage 32a is fully opened. When the first lower temperature door 27a moves to the closed position, the air may pass through the heater core 25 and the air heated by the heater core 25 may be directed into the passenger compartment through the defrost outlet 12a, the face vent outlet 12b, the first floor outlet 12c, etc. When the first lower temperature door 27a moves to the open position, the air may pass through the first lower passage 32a and the air cooled by the evaporator 21 may be directed into the passenger compartment through the defrost outlet 12a, the face vent outlet 12b, the first floor outlet 12c, etc.

Referring to FIGS. 2 and 3, the first upper temperature door 26a may have a rack 43a extending in a longitudinal direction thereof, and teeth of the rack 43a may mesh with teeth of a drive gear 41a. As the first upper temperature door 26a slides by the drive gear 41a and the rack 43a along a substantially vertical direction, the first upper temperature door 26a may move between the open position and the closed position, and accordingly, the opening degree of the first upper temperature door 26a may be adjusted. When the opening degree of the first upper temperature door 26a increases, the first upper temperature door 26a may move toward the open position in which the opening degree of the first upper temperature door 26a is 100%. When the opening degree of the first upper temperature door 26a decreases, the first upper temperature door 26a may move toward the closed position in which the opening degree of the first upper temperature door 26a is 0%. The first upper temperature door 26a may move in a direction in which it intersects with the first upper passage 31a at a predetermined angle or is perpendicular to the first upper passage 31a. Thus, the first upper temperature door 26a may regulate the amount of cooled air passing through the first upper passage 31a and/or the amount of heated air passing through an upper portion of the heater core 25, thereby adjusting the temperature of the air.

Referring to FIGS. 2 and 3, the first lower temperature door 27a may have a rack 44a extending in a longitudinal direction thereof, and teeth of the rack 44a may mesh with teeth of a drive gear 42a. As the first lower temperature door 27a slides by the drive gear 42a and the rack 44a along a substantially vertical direction, the first lower temperature door 27a may move between the open position and the closed position, and accordingly, the opening degree of the first lower temperature door 27a may be adjusted. When the opening degree of the first lower temperature door 27a increases, the first lower temperature door 27a may move toward the open position in which the opening degree of the first lower temperature door 27a is 100%. When the opening degree of the first lower temperature door 27a decreases, the first lower temperature door 27a may move toward the closed position in which the opening degree of the first lower temperature door 27a is 0%. The first lower temperature door 27a may move in a direction in which it intersects with the first lower passage 32a at a predetermined angle or is perpendicular to the first lower passage 32a. Thus, the first lower temperature door 27a may regulate the amount of cooled air passing through the first lower passage 32a and/or the amount of heated air passing through a lower portion of the heater core 25, thereby adjusting the temperature of the air.

The drive gear 41a of the first upper temperature door 26a and the drive gear 42a of the first lower temperature door 27a may be operated by a driver seat side actuator 47. The driver seat side actuator 47 may be operatively connected to the drive gear 41a of the first upper temperature door 26a and the drive gear 42a of the first lower temperature door 27a through a power transmission mechanism 47a such as a belt mechanism, so that the driver seat side actuator 47 may transmit a rotational force to the drive gear 41a of the first upper temperature door 26a and the drive gear 42a of the first lower temperature door 27a. As the drive gear 41a of the first upper temperature door 26a and the drive gear 42a of the first lower temperature door 27a are rotated simultaneously by the driver seat side actuator 47, the first upper temperature door 26a and the first lower temperature door 27a may be moved simultaneously by the driver seat side actuator 47.

When the HVAC system 10 performs cooling for the driver's seat, the driver seat side actuator 47 may move the first upper temperature door 26a toward the open position, and move the first lower temperature door 27a toward the open position. When the first upper temperature door 26a is completely moved to the open position and the first lower temperature door 27a is completely moved to the open position, the first upper passage 31a may be fully opened (the opening degree of the first upper temperature door 26a is 100%), and the first lower passage 32a may be fully opened (the opening degree of the first lower temperature door 27a is 100%), and accordingly the air cooled by the evaporator 21 may only be directed toward the driver's seat of the passenger compartment. When the first upper temperature door 26a is in the open position and the first lower temperature door 27a is in the open position, the maximum cooling operation for the driver's seat may be performed.

When the HVAC system 10 performs heating for the driver's seat, the driver seat side actuator 47 may move the first upper temperature door 26a toward the closed position, and move the first lower temperature door 27a toward the closed position. When the first upper temperature door 26a is completely moved to the closed position and the first lower temperature door 27a is completely moved to the closed position, the first upper passage 31a may be fully closed (the opening degree of the first upper temperature door 26a is 0%), and the first lower passage 32a may be fully closed (the opening degree of the first lower temperature door 27a is 0%), and accordingly the air heated by the heater core 25 may only be directed toward the driver's seat of the passenger compartment. When the first upper temperature door 26a is in the closed position and the first lower temperature door 27a is in the closed position, the maximum heating operation for the driver's seat may be performed.

Figure 4:
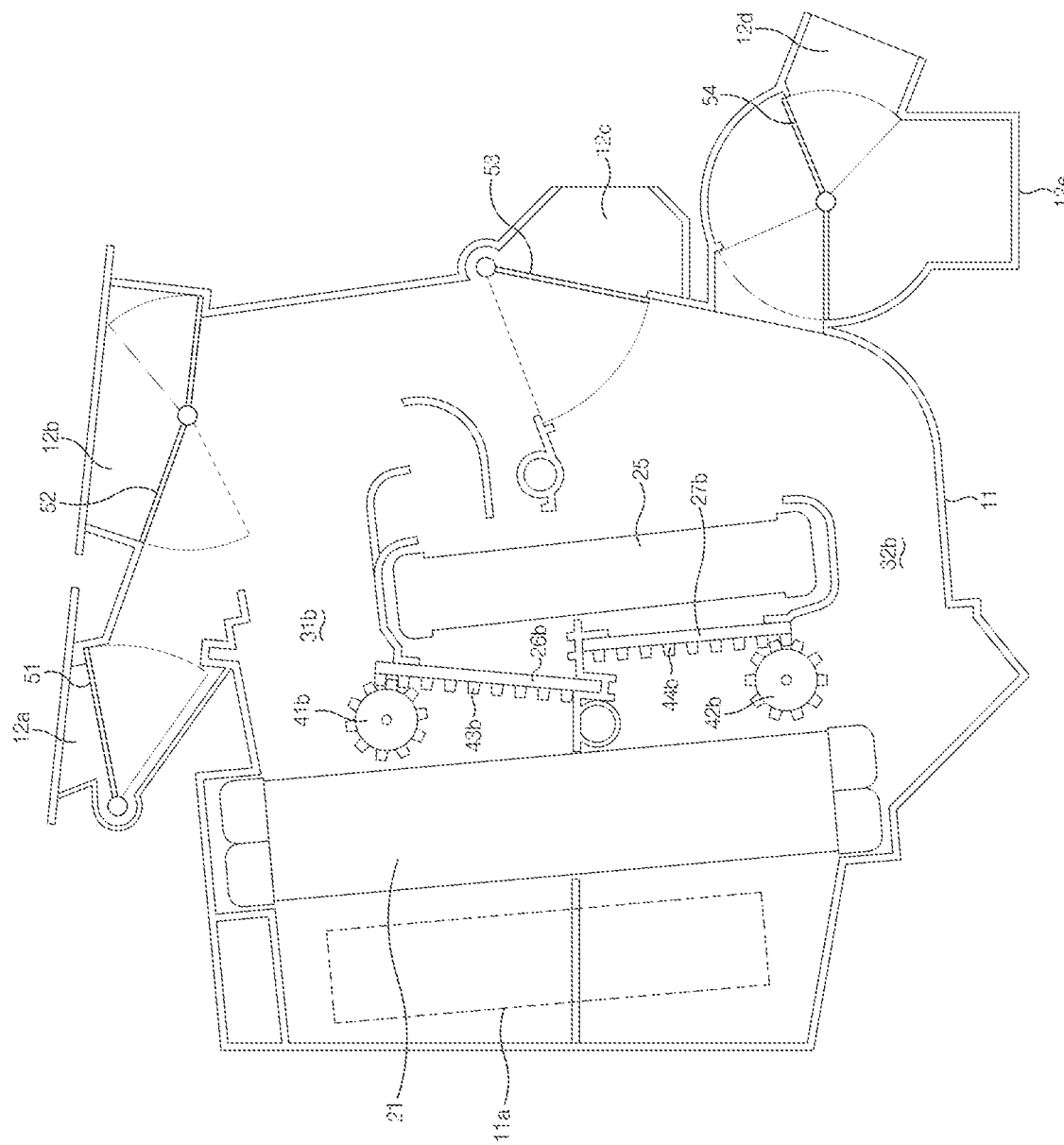
FIG. 4 illustrates a cross-sectional view taken along line B-B of FIG. 2.

Referring to FIGS. 2 and 4, the second upper temperature door 26b may move between a closed position in which the second upper passage 31b is fully closed and an open position in which the second upper passage 31b is fully opened. When the second upper temperature door 26b moves to the closed position, the air may pass through the heater core 25 and the air heated by the heater core 25 may be directed into the passenger compartment through the defrost outlet 12a, the face vent outlet 12b, the first floor outlet 12c, etc. When the second upper temperature door 26b moves to the open position, the air may pass through the second upper passage 31b and the air cooled by the evaporator 21 may be directed into the passenger compartment through the defrost outlet 12a, the face vent outlet 12b, the first floor outlet 12c, etc.

Referring to FIGS. 2 and 4, the second lower temperature door 27b may move between a closed position in which the second lower passage 32b is fully closed and an open position in which the second lower passage 32b is fully opened. When the second lower temperature door 27b moves to the closed position, the air may pass through the heater core 25 and the air heated by the heater core 25 may be directed into the passenger compartment through the defrost outlet 12a, the face vent outlet 12b, the first floor outlet 12c, etc. When the second lower temperature door 27b moves to the open position, the air may pass through the second lower passage 32b and the air cooled by the evaporator 21 may be directed into the passenger compartment through the defrost outlet 12a, the face vent outlet 12b, the first floor outlet 12c, etc.

Referring to FIGS. 2 and 4, the second upper temperature door 26b may have a rack 43b extending in a longitudinal direction thereof, and teeth of the rack 43b may mesh with teeth of a drive gear 41b. As the second upper temperature door 26b slides by the drive gear 41b and the rack 43b along a substantially vertical direction, the second upper temperature door 26b may move between the open position and the closed position, and accordingly, the opening degree of the second upper temperature door 26b may be adjusted. When the opening degree of the second upper temperature door 26b increases, the second upper temperature door 26b may move toward the open position in which the opening degree of the second upper temperature door 26b is 100%. When the opening degree of the second upper temperature door 26b decreases, the second upper temperature door 26b may move toward the closed position in which the opening degree of the second upper temperature door 26b is 0%. The second upper temperature door 26b may move in a direction in which it intersects with the second upper passage 31b at a predetermined angle or is perpendicular to the second upper passage 31b. Thus, the second upper temperature door 26b may regulate the amount of cooled air passing through the second upper passage 31b and/or the amount of heated air passing through the upper portion of the heater core 25, thereby adjusting the temperature of the air.

Referring to FIGS. 2 and 4, the second lower temperature door 27b may have a rack 44b extending in a longitudinal direction thereof, and teeth of the rack 44b may mesh with teeth of a drive gear 42b. As the second lower temperature door 27b slides by the drive gear 42b and the rack 44b along a substantially vertical direction, the second lower temperature door 27b may move between the open position and the closed position, and accordingly, the opening degree of the second lower temperature door 27b may be adjusted. When the opening degree of the second lower temperature door 27b increases, the second lower temperature door 27b may move toward the open position in which the opening degree of the second lower temperature door 27b is 100%. When the opening degree of the second lower temperature door 27b decreases, the second lower temperature door 27b may move toward the closed position in which the opening degree of the second lower temperature door 27b is 0%. The second lower temperature door 27b may move in a direction in which it intersects with the second lower passage 32b at a predetermined angle or is perpendicular to the second lower passage 32b. Thus, the second lower temperature door 27b may regulate the amount of cooled air passing through the second lower passage 32b and/or the amount of heated air passing through the lower portion of the heater core 25, thereby adjusting the temperature of the air.

The drive gear 41b of the second upper temperature door 26b and the drive gear 42b of the second lower temperature door 27b may be operated by a front passenger seat side actuator 48. The front passenger seat side actuator 48 may be operatively connected to the drive gear 41b of the second upper temperature door 26b and the drive gear 42b of the second lower temperature door 27b through a power transmission mechanism 48a such as a belt mechanism, so that the front passenger seat side actuator 48 may transmit a rotational force to the drive gear 41b of the second upper temperature door 26b and the drive gear 42b of the second lower temperature door 27b. As the drive gear 41b of the second upper temperature door 26b and the drive gear 42b of the second lower temperature door 27b are rotated simultaneously by the front passenger seat side actuator 48, the second upper temperature door 26b and the second lower temperature door 27b may be moved simultaneously by the front passenger seat side actuator 48.

When the HVAC system 10 performs cooling for the front passenger seat, the front passenger seat side actuator 48 may move the second upper temperature door 26b toward the open position, and move the second lower temperature door 27b toward the open position. When the second upper temperature door 26b is completely moved to the open position and the second lower temperature door 27b is completely moved to the open position, the second upper passage 31b may be fully opened (the opening degree of the second upper temperature door 26b is 100%), and the second lower passage 32b may be fully opened (the opening degree of the second lower temperature door 27b is 100%), and accordingly the air cooled by the evaporator 21 may only be directed toward the front passenger seat of the passenger compartment. When the second upper temperature door 26b is in the open position and the second lower temperature door 27b is in the open position, the maximum cooling operation for the front passenger seat may be performed.

When the HVAC system 10 performs heating for the front passenger seat, the front passenger seat side actuator 48 may move the second upper temperature door 26b toward the closed position, and move the second lower temperature door 27b toward the closed position. When the second upper temperature door 26b is completely moved to the closed position and the second lower temperature door 27b is completely moved to the closed position, the second upper passage 31b may be fully closed (the opening degree of the second upper temperature door 26b is 0%), and the second lower passage 32b may be fully closed (the opening degree of the second lower temperature door 27b is 0%), and accordingly the air heated by the heater core 25 may only be directed toward the front passenger seat of the passenger compartment. When the second upper temperature door 26b is in the closed position and the second lower temperature door 27b is in the closed position, the maximum heating operation for the front passenger seat may be performed.

The driver seat side actuator 47 and the front passenger seat side actuator 48 may be defined as the front seat side actuators 47 and 48.

Figure 5:
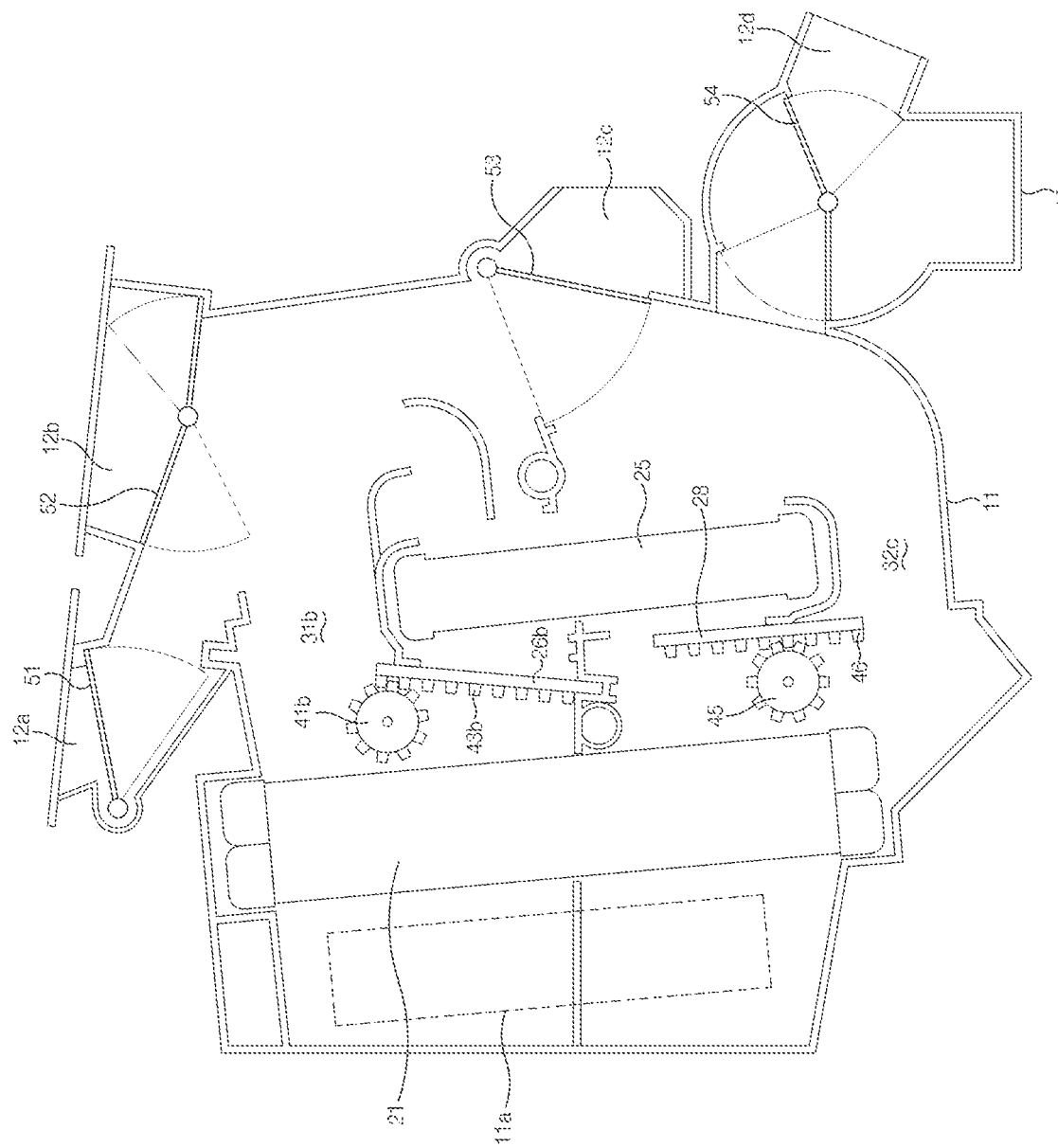
FIG. 5 illustrates a cross-sectional view taken along line C-C of FIG. 2.

Referring to FIG. 5, the rear seat side temperature door 28 may move between a closed position in which the third lower passage 32c is fully closed and an open position in which the third lower passage 32c is fully opened. When the rear seat side temperature door 28 moves to the closed position, the air may pass through the heater core 25 and the air heated by the heater core 25 may be directed toward the rear seats of the passenger compartment through the console outlet 12d and the second floor outlet 12e. When the rear seat side temperature door 28 moves to the open position, the air may pass through the third lower passage 32c and the air cooled by the evaporator 21 may be directed toward the rear seats of the passenger compartment through the console outlet 12d and the second floor outlet 12e.

Referring to FIG. 5, the rear seat side temperature door 28 may have a rack 46 extending in a longitudinal direction thereof, and teeth of the rack 46 may mesh with teeth of a drive gear 45. As the rear seat side temperature door 28 slides by the drive gear 45 and the rack 46 along a substantially vertical direction, the rear seat side temperature door 28 may move between the open position and the closed position, and accordingly, the opening degree of the rear seat side temperature door 28 may be adjusted. When the opening degree of the rear seat side temperature door 28 increases, the rear seat side temperature door 28 may move toward the open position in which the opening degree of the rear seat side temperature door 28 is 100%. When the opening degree of the rear seat side temperature door 28 decreases, the rear seat side temperature door 28 may move toward the closed position in which the opening degree of the rear seat side temperature door 28 is 0%. The rear seat side temperature door 28 may move in a direction in which it intersects with the third lower passage 32c at a predetermined angle or is perpendicular to the third lower passage 32c. The rear seat side temperature door 28 may regulate the amount of cooled air passing through the third lower passage 32c and/or the amount of heated air passing through the lower portion of the heater core 25, thereby adjusting the temperature of the air.

The drive gear 45 of the rear seat side temperature door 28 may be operated by a rear seat side actuator 49. The rear seat side actuator 49 may be operatively connected to the drive gear 45 of the rear seat side temperature door 28 through a power transmission mechanism 49a, so that the rear seat side actuator 49 may transmit a rotational force to the drive gear 45 of the rear seat side temperature door 28. As the drive gear 45 of the rear seat side temperature door 28 is rotated by the rear seat side actuator 49, the rear seat side temperature door 28 may move between the open position and the closed position.

When the HVAC system 10 performs cooling for the rear seats, the rear seat side actuator 49 may move the rear seat side temperature door 28 toward the open position. When the rear seat side temperature door 28 is completely moved to the open position, the third lower passage 32c may be fully opened (the opening degree of the rear seat side temperature door 28 is 100%), and accordingly the air cooled by the evaporator 21 may only be directed toward the rear seats of the passenger compartment. When the rear seat side temperature door 28 is in the open position, the maximum cooling operation for the rear seats may be performed.

When the HVAC system 10 performs heating for the rear seats, the rear seat side actuator 49 may move the rear seat side temperature door 28 toward the closed position. When the rear seat side temperature door 28 is completely moved to the closed position, the third lower passage 32c may be fully closed (the opening degree of the rear seat side temperature door 28 is 0%), and accordingly the air heated by the heater core 25 may only be directed toward the rear seats of the passenger compartment. When the rear seat side temperature door 28 is in the closed position, the maximum heating operation for the rear seats may be performed.

Referring to FIGS. 3 to 5, the casing 11 may include a first mode door 51 opening and closing the defrost outlet 12a, a second mode door 52 opening and closing the face vent outlet 12b, a third mode door 53 opening and closing the first floor outlet 12c, and a fourth mode door 54 opening and closing the console outlet 12d and the second floor outlet 12e.

The vehicle HVAC system 10 may perform the cooling and heating operations under the control of a controller 50, and the controller 50 may include a memory and a processor.

According to an exemplary form, the cooling operation of the vehicle HVAC system 10 may be divided into a face vent mode and a bi-level mode.

When the vehicle HVAC system 10 operates in the face vent mode, the first mode door 51 may close the defrost outlet 12a, the second mode door 52 may open the face vent outlet 12b, the third mode door 53 may close the first floor outlet 12c, the fourth mode door 54 may close the second floor outlet 12e, and the fourth mode door 54 may open the console outlet 12d so that the air cooled by the evaporator 21 may be directed into the passenger compartment through the face vent outlet 12b and the console outlet 12d.

When the vehicle HVAC system 10 operates in the bi-level mode, the first mode door 51 may close the defrost outlet 12a, the second mode door 52 may open the face vent outlet 12b, the third mode door 53 may open the first floor outlet 12c, and the fourth mode door 54 may open the console outlet 12d and the second floor outlet 12e so that the air cooled by the evaporator 21 may be directed into the passenger compartment through the face vent outlet 12b, the first floor outlet 12c, the console outlet 12d, and the second floor outlet 12e.

According to another exemplary form, the heating operation of the vehicle HVAC system 10 may be divided into a defrost mode, a floor mode, and a mixed mode.

When the vehicle HVAC system 10 operates in the defrost mode, the first mode door 51 may open the defrost outlet 12a, the second mode door 52 may close the face vent outlet 12b, the third mode door 53 may close the first floor outlet 12c, and the fourth mode door 54 may close the console outlet 12d and the second floor outlet 12e so that the air heated by the heater core 25 may be directed into the passenger compartment through the defrost outlet 12a.

When the vehicle HVAC system 10 operates in the floor mode, the first mode door 51 may close the defrost outlet 12a, the second mode door 52 may close the face vent outlet 12b, the third mode door 53 may open the first floor outlet 12c, and the fourth mode door 54 may open the console outlet 12d and the second floor outlet 12e so that the air heated by the heater core 25 may be directed into the passenger compartment through the first floor outlet 12c, the console outlet 12d, and the second floor outlet 12e.

When the vehicle HVAC system 10 operates in the mixed mode, the first mode door 51 may open the defrost outlet 12a, the second mode door 52 may close the face vent outlet 12b, the third mode door 53 may open the first floor outlet 12c, and the fourth mode door 54 may open the console outlet 12d and the second floor outlet 12e so that the air heated by the heater core 25 may be directed into the passenger compartment through the defrost outlet 12a, the first floor outlet 12c, the console outlet 12d, and the second floor outlet 12e.

A method for controlling a vehicle HVAC system according to an exemplary form of the present disclosure may control a cooling operation for the rear seats independently when an outdoor condition of the vehicle meets or reaches a reference high temperature condition.

Figure 6:
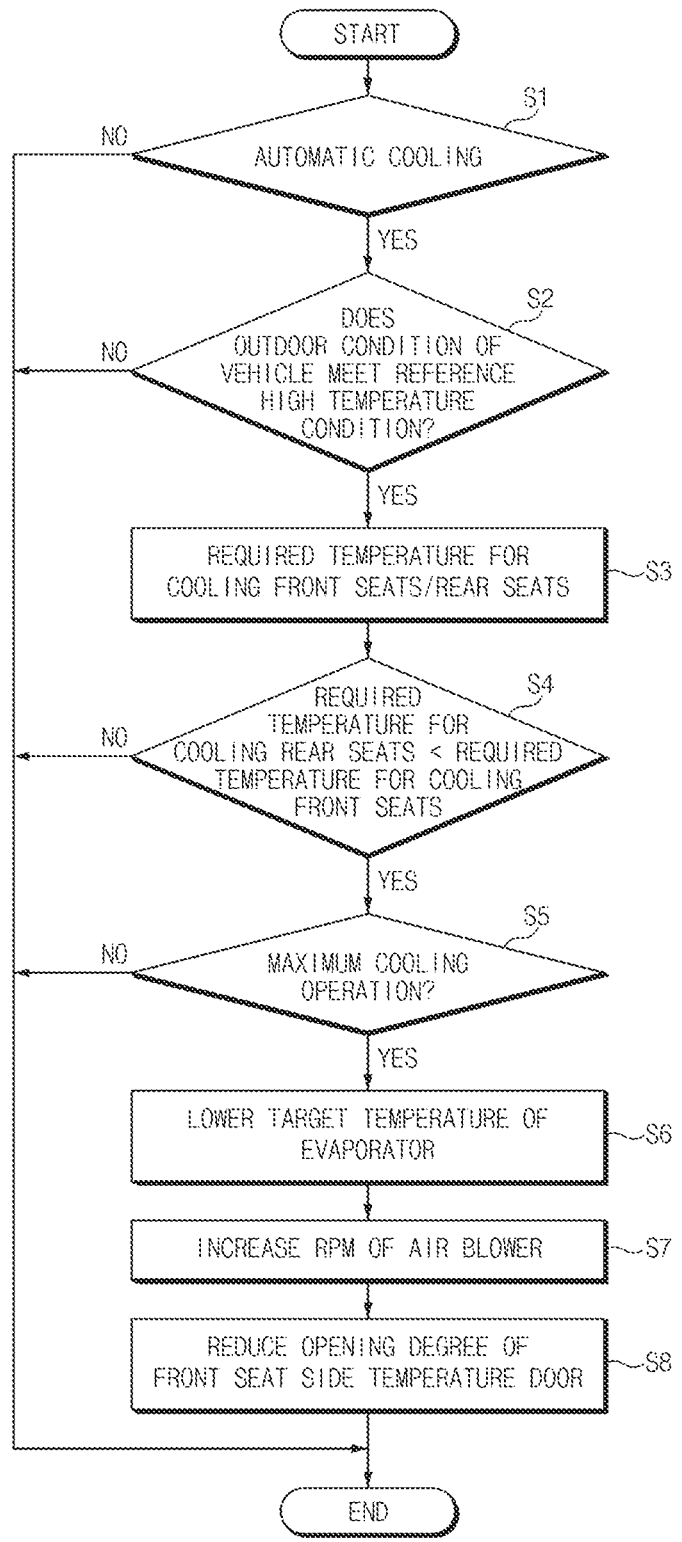
FIG. 6 illustrates a flowchart of a method for controlling a vehicle HVAC system according to an exemplary form of the present disclosure.

Referring to FIG. 6, the controller 50 may determine whether the vehicle HVAC system 10 performs an automatic cooling operation (S1).

When the vehicle HVAC system 10 performs the automatic cooling operation, it may be determined whether the outdoor condition of the vehicle meets or reaches the reference high temperature condition (S2). Specifically, the reference high temperature condition may be defined as follows: an outdoor temperature of the vehicle is higher than or equal to a reference outdoor temperature (for example, 30° C.), and the solar energy transferred to the vehicle is higher than or equal to reference solar energy (for example, 500 W). For example, when the outdoor temperature of the vehicle is higher than or equal to the reference outdoor temperature of 30° C., and the solar energy transferred to the vehicle is higher than or equal to the reference solar energy of 500 W, the controller 50 may determine whether the outdoor condition of the vehicle meets or reaches the reference high temperature condition based on a rear-seat control index (RCI) map (see FIG. 7).

Figure 7:
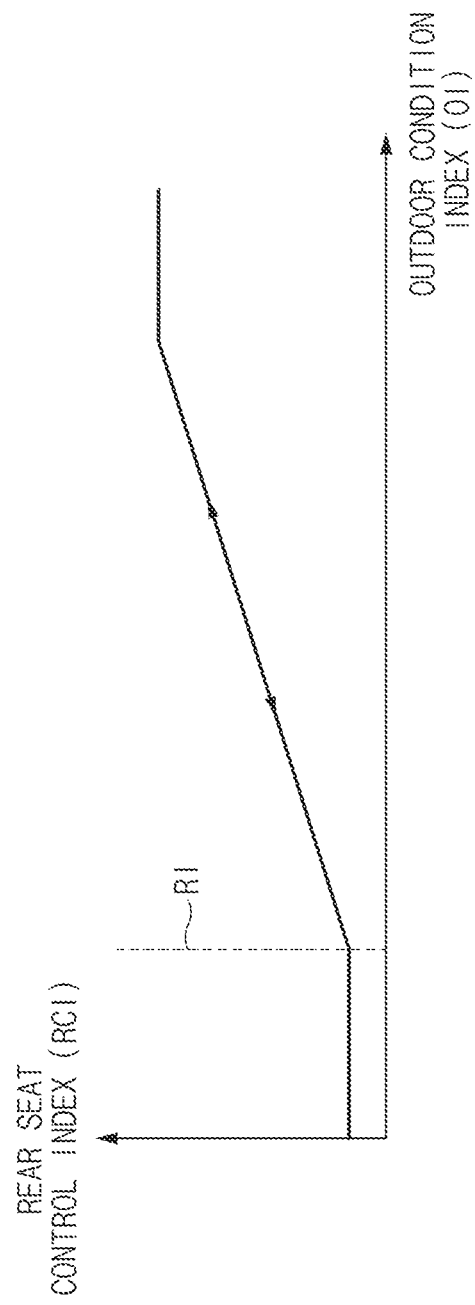
FIG. 7 illustrates a rear seat control index (RCI) map used in a method for controlling a vehicle HVAC system according to an exemplary form of the present disclosure.

FIG. 7 illustrates the RCI map showing a rear seat control index RCI according to an outdoor condition index OI. The RCI map may be stored in the memory of the controller 50. The outdoor condition index OI of the vehicle may be defined as a combination of the outdoor temperature of the vehicle and the solar energy transferred to the vehicle, and the rear seat control index RCI may be defined as the control of a rear seat side temperature according to the outdoor condition of the vehicle. Referring to FIG. 7, when the outdoor condition index OI of the vehicle reaches a reference index RI, it may be determined that the outdoor condition of the vehicle meets or reaches the reference high temperature condition. The reference index RI may be defined as a combination of the reference outdoor temperature and the reference solar energy. When the outdoor condition index OI of the vehicle exceeds the reference index RI, the rear seat control index RCI may increase. The rear seat control index RCI may be defined by the following equation 1:

$$\text{RCI} = (\text{outdoor temperature} - \text{reference outdoor temperature}) \times \text{first coefficient} + (\text{solar energy} - \text{reference solar energy}) \times \text{second coefficient} \quad \text{[Equation 1]}$$

For example, the reference outdoor temperature may be 30° C., and the reference solar energy may be 500 W. A first coefficient may relate to the outdoor temperature and/or reference outdoor temperature, the first coefficient may be determined based on the outdoor temperature and/or reference outdoor temperature. For example, the first coefficient may be 10. A second coefficient may relate to the solar energy (solar radiation) and/or reference solar energy (reference solar radiation), the second coefficient may be determined based on the solar energy and/or reference solar energy. For example, the second coefficient may be 0.2.

When the outdoor condition of the vehicle meets or reaches the reference high temperature condition, a required temperature for cooling the rear seats and a required temperature for cooling the front seats may be set by passengers (occupants), and the controller 50 may monitor the required temperature for cooling the rear seats and the required temperature for cooling the front seats (S3). For example, when the outdoor condition of the vehicle meets or reaches the reference high temperature condition, a rear seat side temperature may be relatively increased compared to a front seat side temperature. Accordingly, the passengers seated in the rear seats may tend to set the required temperature for cooling the rear seats to be lower than the required temperature for cooling the front seats, and the controller 50 may monitor the required temperature for cooling the rear seats and the required temperature for cooling the front seats which have been set by the passengers.

Figure 10:
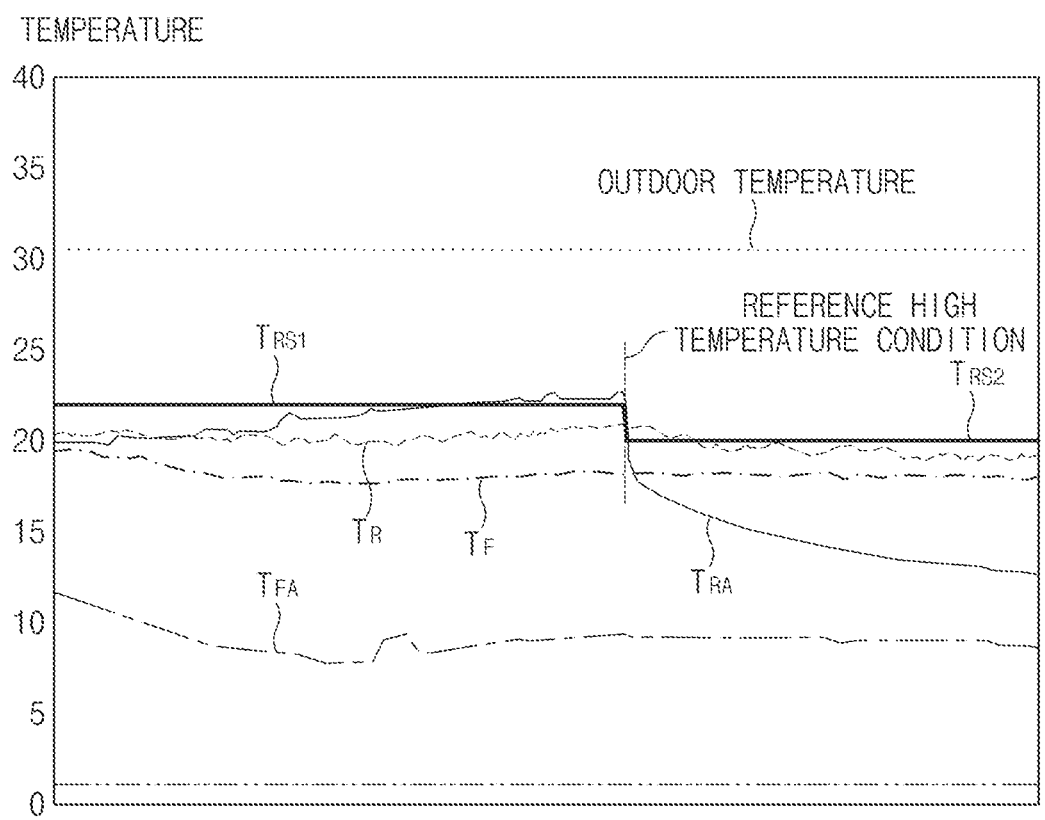
FIG. 10 illustrates a graph of front and rear seat side temperatures which are controlled by a vehicle HVAC system according to an exemplary form of the present disclosure.

The controller 50 may determine whether the required temperature for cooling the rear seats is lower than the required temperature for cooling the front seats (S4). That is, when the outdoor condition of the vehicle meets or reaches the reference high temperature condition, the controller 50 may determine whether a cooling requirement for the rear seats is greater than a cooling requirement for the front seats. Referring to FIG. 10, when the outdoor condition of the vehicle meets or reaches the reference high temperature condition, a second required temperature $T_{RS2}$ for cooling the rear seats which is set after the outdoor condition of the vehicle meets or reaches the reference high temperature condition may be lower than a first required temperature $T_{RS1}$ for cooling the rear seats which is set before the outdoor condition of the vehicle meets or reaches the reference high temperature condition.

When the required temperature for cooling the rear seats is lower than the required temperature for cooling the front seats, it may be determined whether the maximum cooling operation for the rear seats is performed (S5). Specifically, the controller 50 may monitor the opening degree of the rear seat side temperature door 28 to determine whether the maximum cooling operation for the rear seats is performed. For example, when the opening degree of the rear seat side temperature door 28 is 100%, the third lower passage 32c may be fully opened so that only the air cooled by the evaporator 21 may be guided toward the rear seats 8. Thus, the controller 50 may determine that the maximum cooling operation for the rear seats 8 is performed.

According to an exemplary form, the controller 50 may monitor a voltage applied to the rear seat side actuator 49 and determine whether the maximum cooling operation for the rear seats is performed. A predetermined range of voltage (for example, 0.3-4.7V) may be applied to the rear seat side actuator 49. When a minimum voltage (for example, 0.3-0.5V) is applied to the rear seat side actuator 49, the opening degree of the rear seat side temperature door 28 may be 100%, and when a maximum voltage (for example, 4.7V) is applied to the rear seat side actuator 49, the opening degree of the rear seat side temperature door 28 may be 0%. When the voltage applied to the rear seat side actuator 49 is lower than the minimum voltage (0.3-0.5V), the controller 50 may determine that the maximum cooling operation for the rear seats is performed.

Figure 8:
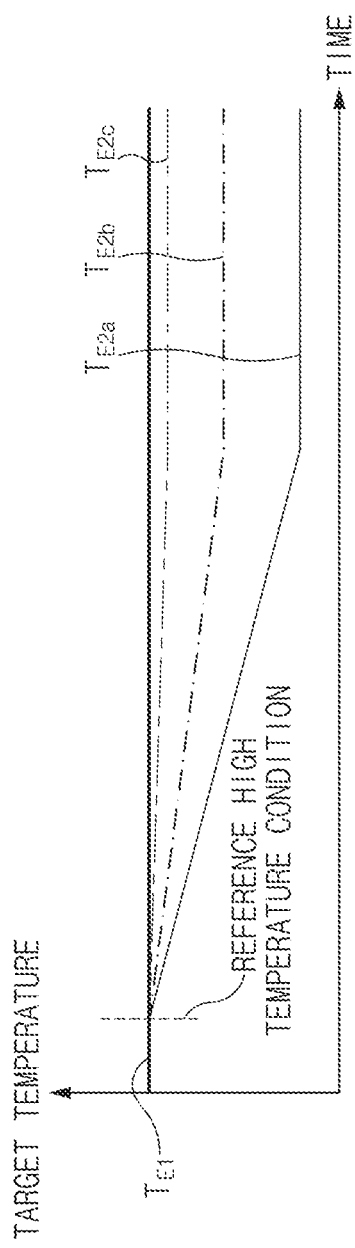
FIG. 8 illustrates a graph of the setting of second target temperatures of an evaporator in a vehicle HVAC system according to an exemplary form of the present disclosure.

When it is determined that the maximum cooling operation for the rear seats is performed, the controller 50 may set a target temperature of the evaporator 21 to be lowered based on the second required temperature $T_{RS2}$ for cooling the rear seats set after the outdoor condition of the vehicle meets or reaches the reference high temperature condition (S6). Specifically, the set target temperature of the evaporator 21 may be a second target temperature $T_{E2a}$, $T_{E2b}$, or $T_{E2c}$ of the evaporator 21 lower than a first target temperature $T_{E1}$ of the evaporator 21 set before the outdoor condition of the vehicle meets or reaches the reference high temperature condition. Referring to FIG. 8, the second target temperature $T_{E2a}$, $T_{E2b}$, $T_{E2c}$ of the evaporator 21 may vary according to the second required temperature $T_{RS2}$ for cooling the rear seats. When the second target temperature of the evaporator 21 is set, revolutions per minute (RPM) of the compressor 22 of the refrigeration cycle 20 may increase accordingly. When the second target temperature of the evaporator 21 is set, the RPM of the compressor 22 may relatively increase, and the flow rate of a refrigerant directed into the evaporator 21 may increase. Accordingly, the temperature of cooled air may be significantly lowered, and a rear seat side temperature measured after the outdoor condition of the vehicle meets or reaches the reference high temperature condition may be lower than a rear seat side temperature measured before the outdoor condition of the vehicle meets or reaches the reference high temperature condition (see FIG. 10).

Figure 9:
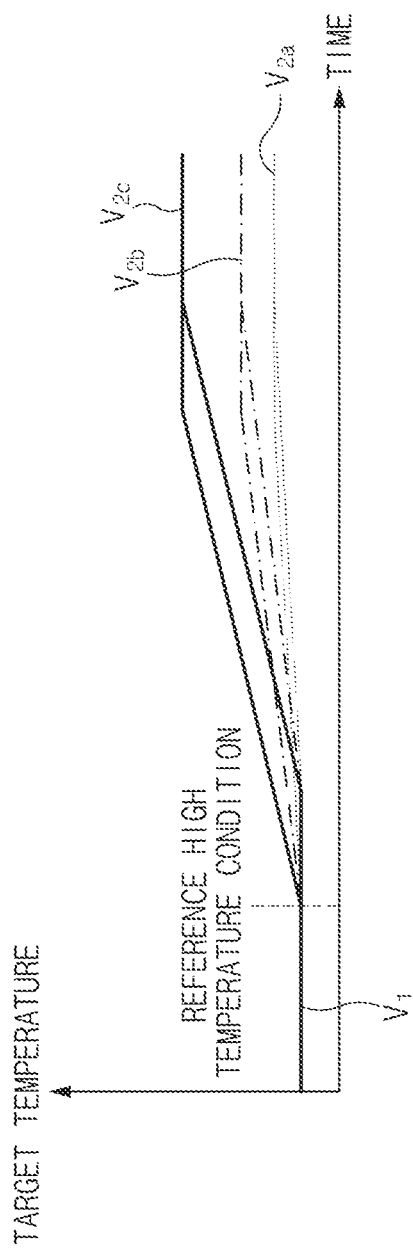
FIG. 9 illustrates a graph of the setting of second voltages applied to an air blower in a vehicle HVAC system according to an exemplary form of the present disclosure.

When the maximum cooling operation for the rear seats is performed, the controller 50 may increase RPM of the air blower 5 based on the second required temperature $T_{RS2}$ for cooling the rear seats (S7). The RPM of the air blower 5 may be proportional to a voltage applied to the air blower 5. For example, when the voltage applied to the air blower 5 relatively increases, the RPM of the air blower 5 may relatively increase, and when the voltage applied to the air blower 5 relatively decreases, the RPM of the air blower 5 may relatively decrease. By increasing the voltage applied to the air blower 5, the RPM of the air blower 5 may increase. The voltage applied to the air blower 5 may be a second voltage $V_{2a}$, $V_{2b}$, or $V_{2c}$ higher than a first voltage $V_1$ set before the outdoor condition of the vehicle meets or reaches the reference high temperature condition. Referring to FIG. 9, the second voltage $V_{2a}$, $V_{2b}$, $V_{2c}$ applied to the air blower 5 may vary according to the second required temperature $T_{RS2}$ for cooling the rear seats. When the second voltage applied to the air blower 5 is set, the flow rate of the air directed into the casing 11 may relatively increase. Accordingly, the flow rate of the air cooled by the evaporator 21 may increase, and the rear seat side temperature measured after the outdoor condition of the vehicle meets or reaches the reference high temperature condition may be lower than the rear seat side temperature measured before the outdoor condition of the vehicle meets or reaches the reference high temperature condition (see FIG. 10).

In order to prevent the front seat side temperature from being excessively lowered as the second target temperature of the evaporator 21 is set, the controller 50 may reduce the opening degree of the front seat side temperature doors 26a, 26b, 27a, and 27b based on the second required temperature $T_{RS2}$ for cooling the rear seats (S8). The controller 50 may set a second opening degree of the front seat side temperature doors 26a, 26b, 27a, and 27b lower than a first opening degree of the front seat side temperature doors 26a, 26b, 27a, and 27b set before the outdoor condition of the vehicle meets or reaches the reference high temperature condition. The controller 50 may monitor a voltage applied to the front seat side actuators 47 and 48 to check the opening degree of the front seat side temperature doors 26a, 26b, 27a, and 27b.

A predetermined range of voltage (for example, 0.3-4.7V) may be applied to each of the front seat side actuators 47 and 48. When a minimum voltage (for example, 0.3-0.5V) is applied to each of the front seat side actuators 47 and 48, the opening degree of the front seat side temperature doors 26a, 26b, 27a, and 27b may be 100%, and when a maximum voltage (for example, 4.7V) is applied to each of the front seat side actuators 47 and 48, the opening degree of the front seat side temperature doors 26a, 26b, 27a, and 27b may be 0. The controller 50 may increase the voltage applied to the front seat side actuators 47 and 48 to thereby reduce the opening degree of the front seat side temperature doors 26a, 26b, 27a, and 27b. Specifically, the voltage applied to the front seat side actuators 47 and 48 may be a second voltage higher than a first voltage set before the outdoor condition of the vehicle meets or reaches the reference high temperature condition. As the second voltage is applied to the front seat side actuators 47 and 48, the opening degree of the front seat side temperature doors 26a, 26b, 27a, and 27b may be reduced. The second voltage may be defined by the following equation 2:

$$\text{Second voltage} = \text{first voltage} + (\text{RCI} \times \text{third coefficient}) \times \text{tuning value} \quad [\text{Equation 2}]$$

Here, a third coefficient is 0.001, and a tuning value may vary according to the operating states of the HVAC system 10.

FIG. 10 illustrates a graph of front and rear seat side temperatures which are controlled by a vehicle HVAC system according to an exemplary form of the present disclosure.

Referring to FIG. 10, the first required temperature $T_{RS1}$ for cooling the rear seats may be set before the outdoor condition of the vehicle meets or reaches the reference high temperature condition, and the second required temperature $T_{RS2}$ for cooling the rear seats may be set after the outdoor condition of the vehicle meets or reaches the reference high temperature condition. A temperature $T_{FA}$ of air directed toward the front seats may be kept constant before and after the outdoor condition of the vehicle meets or reaches the reference high temperature condition, and accordingly a front seat side temperature $T_F$ may be kept constant before and after the outdoor condition of the vehicle meets or reaches the reference high temperature condition. As the second target temperature of the evaporator 21 is set, a temperature $T_{RA}$ of air directed toward the rear seats may be rapidly reduced after the outdoor condition of the vehicle meets or reaches the reference high temperature condition, and accordingly a rear seat side temperature $T_R$ may be lowered to meet or reaches the second required temperature $T_{RS2}$ for cooling the rear seats.

As set forth above, according to exemplary forms of the present disclosure, when the cooling requirement for the rear seats is greater than the cooling requirement for the front seats, the required temperature for cooling the rear seats may be set to be lower than the required temperature for cooling the front seats. By controlling the cooling operation for the rear seats independently, the passengers' comfort may be improved. In particular, by lowering the temperature of the cooled air directed toward the rear seats, the cooling requirement for the rear seats may be met, and thus the passengers' comfort may be increased.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A method for controlling a vehicle heating, ventilation, and air conditioning (HVAC) system including a casing configured to direct air from outdoors into an interior of a passenger compartment, an air blower blowing the air into the casing, an evaporator disposed in the casing, a heater core disposed downstream of the evaporator, and a front seat side temperature door and a rear seat side temperature door disposed between the evaporator and the heater core, the method comprising:

based on a determination that an outdoor condition of the vehicle meets a reference high temperature condition, determining, by a controller, whether a required temperature for cooling rear seats is set to be lower than a required temperature for cooling front seats; and based on a determination that an outdoor condition of the vehicle does not meet the reference high temperature condition, the method is terminated;

based on a determination that the required temperature for cooling the rear seats is set to be lower than the required temperature for cooling the front seats, lowering, by the controller, a target temperature of the evaporator based on the set required temperature for cooling the rear seats; and based on a determination that the required temperature for cooling the rear seats is not set to be lower than the required temperature for cooling the front seats, the method is terminated.

2. The method according to claim 1, further comprising:
based on a determination that the required temperature for cooling the rear seats is set to be lower than the required temperature for cooling the front seats, determining, by the controller, whether a maximum cooling operation for the rear seats is performed,
wherein based on a determination that the maximum cooling operation for the rear seats is performed, the target temperature of the evaporator set by the controller is a second target temperature lower than a first target temperature which is set before the outdoor condition of the vehicle meets the reference high temperature condition.

3. The method according to claim 2, further comprising:
based on the determination that the maximum cooling operation for the rear seats is performed, increasing, by the controller, revolutions per minute (RPM) of the air blower based on the set required temperature for cooling the rear seats.

4. The method according to claim 3, further comprising:
increasing, by the controller, a voltage applied to the air blower to increase the RPM of the air blower.

5. The method according to claim 4, wherein the voltage applied to the air blower is a second voltage higher than a first voltage which is set before the outdoor condition of the vehicle meets the reference high temperature condition.

6. The method according to claim 2, further comprising:
based on the determination that the maximum cooling operation for the rear seats is performed, reducing, by the controller, an opening degree of the front seat side temperature door based on the set required temperature for cooling the rear seats.

7. The method according to claim 6, wherein the controller reduces the opening degree of the front seat side temperature door by increasing a voltage applied to a front seat side actuator by which the front seat side temperature door is operated.

8. The method according to claim 7, wherein the voltage applied to the front seat side actuator is a second voltage higher than a first voltage which is set before the outdoor condition of the vehicle meets the reference high temperature condition.

9. The method according to claim 2, wherein determining whether the maximum cooling operation for the rear seats is performed includes monitoring, by the controller, an opening degree of the rear seat side temperature door.

10. The method according to claim 9, wherein monitoring the opening degree of the rear seat side temperature door includes: monitoring a voltage applied to a rear seat side actuator by which the rear seat side temperature door is operated.

* * * * *